United States Patent
Xiong et al.

(10) Patent No.: US 10,882,184 B2
(45) Date of Patent: Jan. 5, 2021

(54) SERVO MOTION CONTROL METHOD AND APPARATUS AND ROBOT USING THE SAME

(71) Applicant: UBTECH Robotics Corp, Shenzhen (CN)

(72) Inventors: Youjun Xiong, Shenzhen (CN); Lifu Zhang, Shenzhen (CN); Hanyu Sun, Shenzhen (CN); Xi Bai, Shenzhen (CN); Jianxin Pang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 150 days.

(21) Appl. No.: 16/236,521

(22) Filed: Dec. 30, 2018

(65) Prior Publication Data
US 2020/0164511 A1    May 28, 2020

(30) Foreign Application Priority Data

Nov. 22, 2018 (CN) .......................... 2018 1 1397311

(51) Int. Cl.
*G05B 19/19* (2006.01)
*B25J 9/16* (2006.01)
*B25J 9/00* (2006.01)

(52) U.S. Cl.
CPC .......... *B25J 9/1664* (2013.01); *B25J 9/0009* (2013.01)

(58) Field of Classification Search
CPC ...... B25J 9/1664; B25J 9/0009; G05B 19/402
See application file for complete search history.

(56) References Cited

U.S. PATENT DOCUMENTS

2019/0061054 A1* 2/2019 Mizuno ................ B23K 26/705

* cited by examiner

*Primary Examiner* — Karen Masih (57) ABSTRACT

The present disclosure provides a servo motion control method and apparatus, as well as a robot using the same. The method includes: obtaining position parameters of a plurality of control vertices of a servo in a constant speed motion; creating a first smooth trajectory equation of the servo to move from the starting point to the ending point based on the position parameters of the plurality of control vertices; and controlling the servo to move based on the first smooth trajectory equation. The present disclosure is capable of realizing the smooth control of the motion of the servo from a starting position to an ending position, and avoiding the severe impacts during starting and stopping which affect the stability of the servo while the servo is in a constant high-speed motion.

13 Claims, 5 Drawing Sheets

SERVO MOTION CONTROL METHOD AND APPARATUS AND ROBOT USING THE SAME

CROSS REFERENCE TO RELATED APPLICATIONS

This application claims priority to Chinese Patent Application No. 201811397311.0, filed Nov. 22, 2018, which is hereby incorporated by reference herein as if set forth in its entirety.

BACKGROUND

1. Technical Field

The present disclosure relates to intelligent robot technology, and particularly to a servo motion control method and apparatus, as well as a robot using the same.

2. Description of Related Art

With the continuous development of intelligent technology, the researches of intelligent robots have gradually involved the applications in people's daily life. In which, consumer or entertainment robots have gradually employed in home, entertainment and service industry. Since the types of robots have lower cost, the motions of their joints are generally simple.

Figure 1:
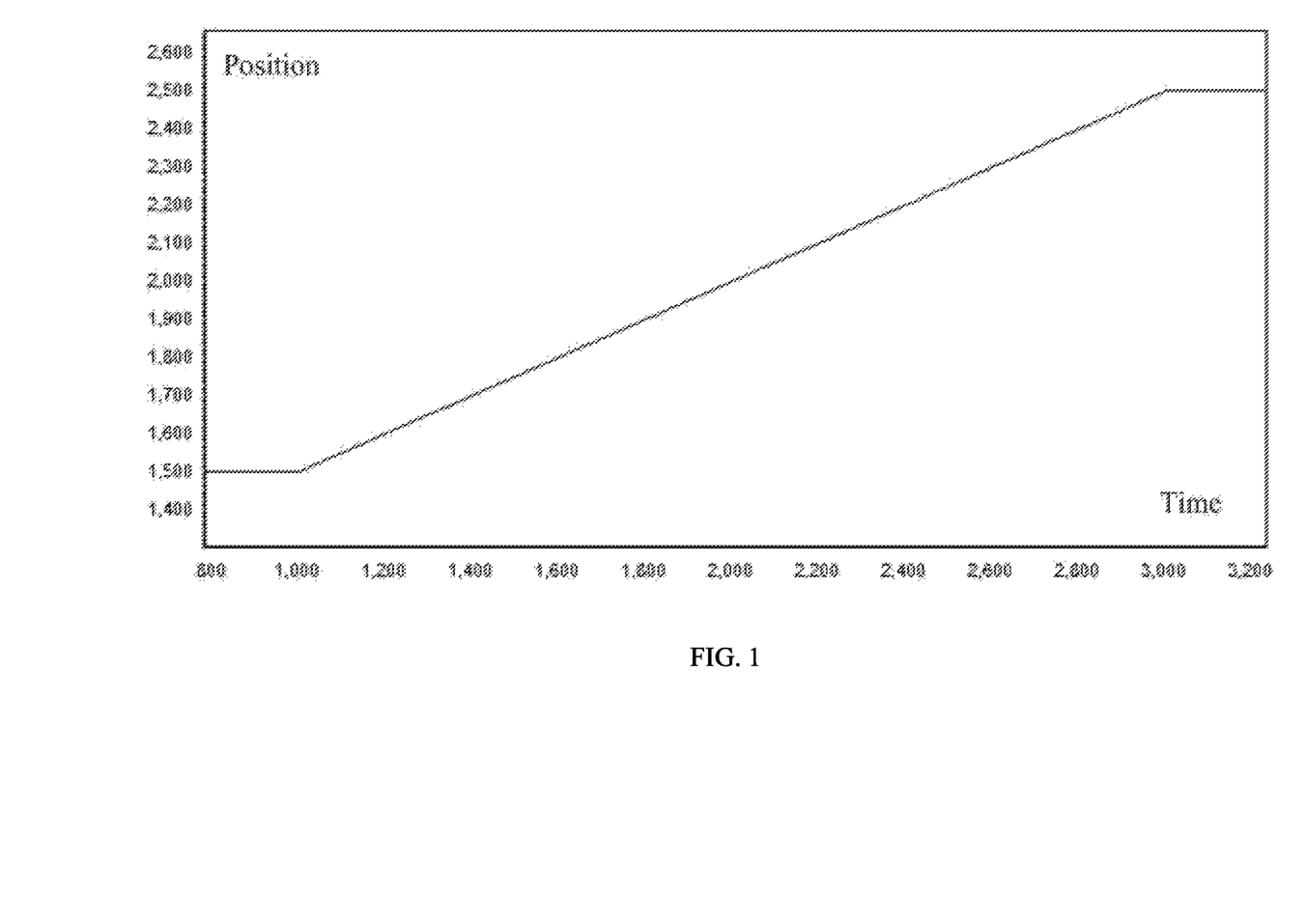
FIG. 1 is a schematic diagram of a motion curse of a servo in a constant speed motion according to the prior art.

FIG. 1 is a schematic diagram of a motion curve of a servo in a constant speed motion according to the prior art. As shown in FIG. 1, in the prior art, when realizing the servo motion control in consumer or entertainment robots, a constant speed motion mode is often used. The horizontal axis is the time (in milliseconds) and the vertical axis is the servo position (in 360/4096 degrees). The servo is stopped at the position of 1500 in the beginning, and begins to be moved at a constant speed at the time of 1000, and is finally stopped at the position of 2500 at the time of 13000. However, in this servo motion control manner, the servo will have severe impacts during starting and stopping when the servo is in a constant high-speed motion. The impacts will seriously affect the stability of the servo, which will cause a robot using the servo to move rigidly and even affect the steadiness of the robot. When it is applied to the servos in the joints of consumer or entertainment robots, the motions of the robots using the servos are often too stiff or rigid, which a fleets the robots' performance and user experience.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 2:
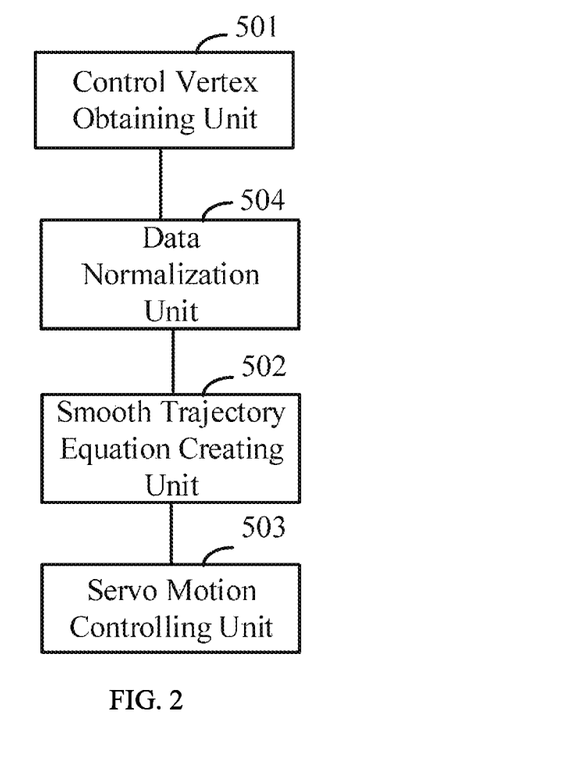
FIG. 2 is a schematic block diagram of a servo motion control apparatus according to an embodiment of present disclosure.
Figure 3:
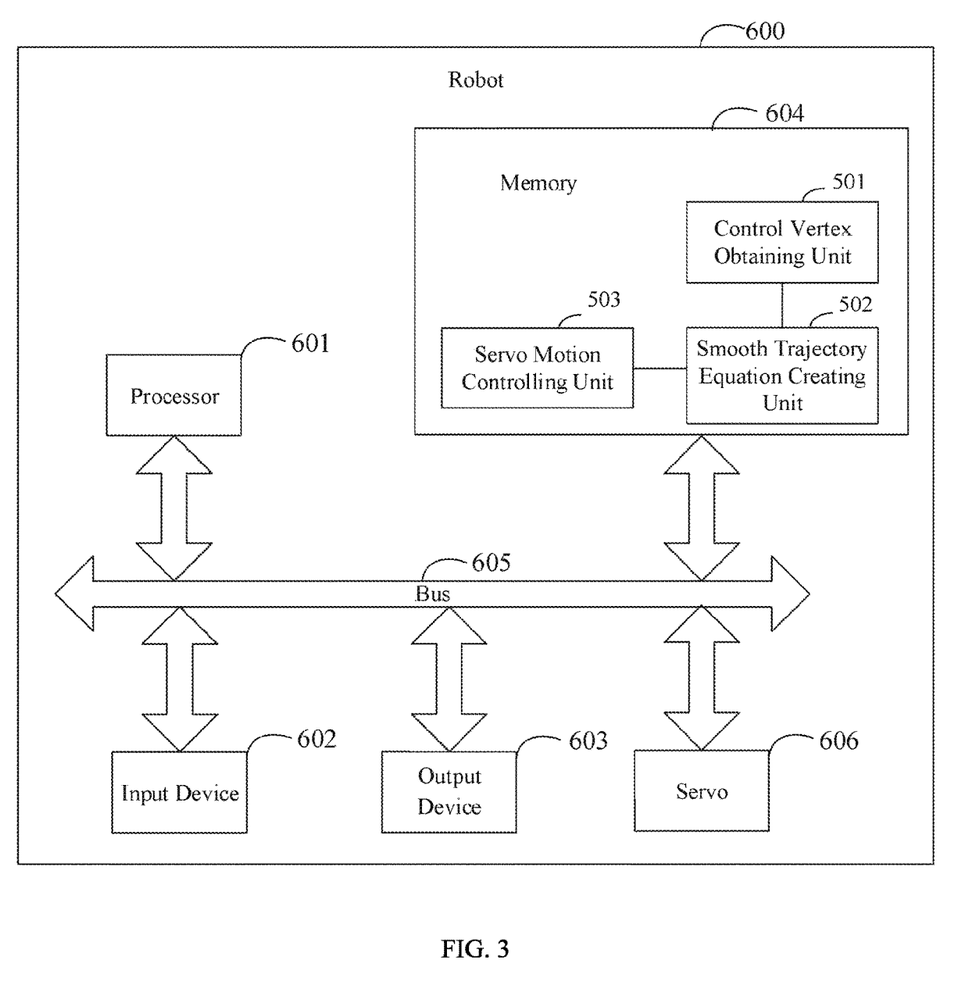
FIG. 3 is a schematic block diagram of a robot according to an embodiment of present disclosure.
Figure 4:
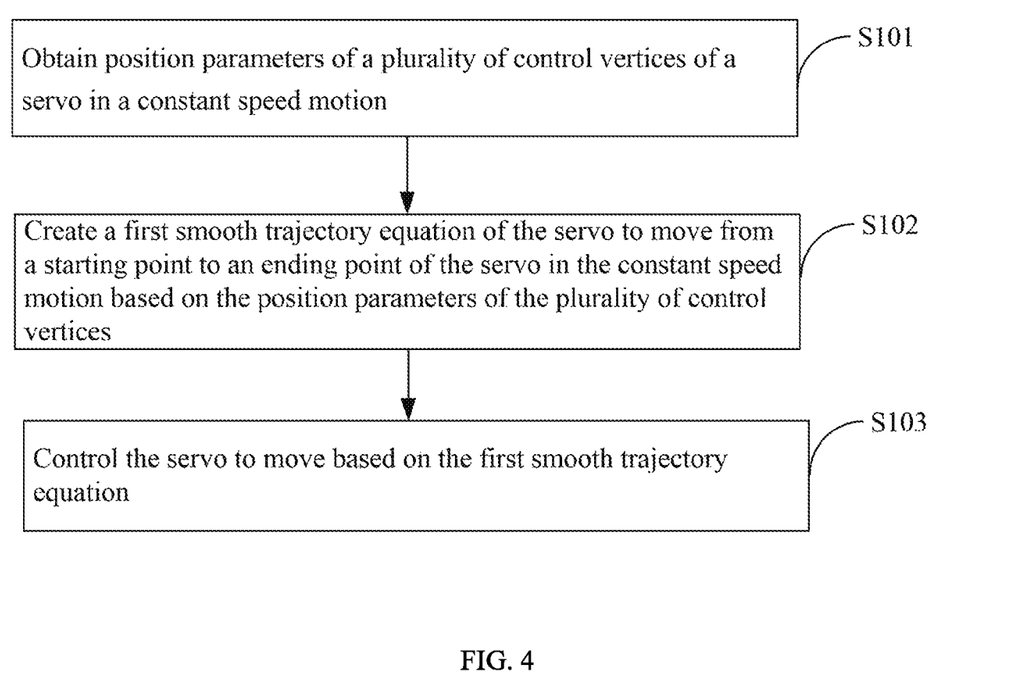
FIG. 4 is a flow chart of a servo motion control method according to an embodiment of present disclosure.

FIG. 2 is a schematic block diagram of a servo motion control apparatus according to an embodiment of present disclosure, which corresponds to the servo motion control method of FIG. 4. For the convenience of description, only pans related to this embodiment are shown. In this embodiment, the apparatus may be applied to a robot with a servo as shown in FIG. 3. As shown in FIG. 2, in this embodiment, a servo motion control apparatus includes a control vertex obtaining unit 501, a smooth trajectory equation creating unit 502, and a servo motion controlling unit 503.

The control vertex obtaining unit 501 is configured to obtain position parameters of a plurality of control vertices of the servo in a constant speed motion, wherein the plurality of control vertices are selectively a starling point and an ending point of the servo in the constant speed motion or preset fixed points of the servo in the constant speed motion.

The smooth trajectory equation creating unit 502 is configured to create a first smooth trajectory equation of the servo to move from the starting point to the ending point based on the position parameters of the plurality of control vertices.

The servo motion controlling unit 503 is configured to control the servo to move based on the first smooth trajectory equation.

It can be seen from the above-mentioned description that, by obtaining position parameters of a plurality of control vertices of a servo in a constant speed motion, where the plurality of control vertices are selectively a starting point and an ending point of the servo in the constant speed motion or preset fixed points of the servo in the constant speed motion; creating a first smooth trajectory equation of the servo to move from the starting point to the ending point based on the position parameters of the plurality of control vertices; and controlling the servo to move based on the first smooth trajectory equation, it is capable of realizing the smooth control of the motion of the servo from a starting position to an ending position, and avoiding the severe impacts during starting and stopping while the servo is in a constant high-speed motion, since the impacts will seriously affect the stability of the servo, which will cause a robot using the servo to move rigidly and even affect the steadiness of the robot. At the same time, the method is simple and suitable for the control of the servo of low-cost consumer or entertainment robots, which enhances the movement performance and user experience of the robot.

Referring to FIG. 2, the amount of the control vertices is n+1, each of the control vertices is represented as $P_i$ (i=0, 1, ..., n). The apparatus further includes a data normalization unit 504 configured to normalize time parameters of the servo in the constant speed motion into an interval [0, 1].

Correspondingly, the created first smooth trajectory equation is:

$$P(t) = \sum_{i=0}^{n} P_i B_{i,n}(t);$$

where $$B_{i,n}(t) = C_n^i (1-t)^{n-i} t^i, \quad C_n^d = \frac{n!}{i!(n-i)!},$$

$0 \leq t \leq 1$.

Referring to FIG. 2, in this embodiment, the amount of the control vertices is four. The control vertices includes a first control vertex $P_0$, a second control vertex $P_1$, a third control vertex $P_2$, and a fourth control vertex $P_3$.

The data normalization unit 502 is further configured to:

import the first control vertex $P_0$, the second control vertex $P_1$, the third control vertex $P_2$, and the fourth control vertex $P_3$ into the first smooth trajectory equation to obtain a second smooth trajectory equation:

$$P(t)=(1-t)^3 p_0 + 3t(1-t)^2 P_1 + 3t^2 P_2 + t^3 P_3.$$

Referring to FIG. 2, in this embodiment, the first control vertex $P_0$ is equal to the second control vertex $P_1$, and the third control vertex $P_2$ is equal to the fourth control vertex $P_3$.

The data normalization unit 502 is further configured to:

combine $P_0 = P_1$, $P_2 = P_3$, and the second smooth trajectory equation to obtain a third smooth trajectory equation:

$$P(t)=(1-t)^2(1+2t)P_1 + t^2(3-2t)P_2.$$

In one embodiment, the first control vertex $P_0$ and the second control vertex $P_1$ are the position parameters of the starting point, the third control vertex $P_2$ and the fourth control vertex $P_3$ are the position parameters of the ending point.

It should be noted that, each of the above-mentioned modules/units may be implemented in the form of hardware (e.g., a circuit), software (e.g., a program), or a combination thereof (e.g., a circuit with a single chip microcomputer).

FIG. 3 is a schematic block diagram of a robot according to an embodiment of present disclosure. As shown in FIG. 3, in this embodiment, the robot 600 may include one or more processors 601, one or more input devices 602, one or more output devices 603, one or more memories 604, and one or more servos 606. The processor 601, the input device 602, the output device 603, and the memory 604 perform communication with each other via a communication bus 605. The memory 604 is configured to store computer programs including instructions. The processor 601 is configured to execute instructions stored by the memory 604. In which, the processor 601 may be configured to call the instructions to execute the steps in each of the method embodiments, for example, steps S101-S103 shown in FIG. 4; alternatively, the processor 601 may be configured to call the instructions to perform the functions of each module/unit in each of the device embodiments, for example, the functions of the modules 501-504 shown in FIG. 2.

It should be comprehended that, in this embodiment, the processor 601 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The input device 602 may include a touch panel, a fingerprint sensor (for collecting fingerprint information of the user and direction information of the fingerprint), a microphone, and the like, and the output device 603 may include a display (LCD or the like), a speaker, and the like.

The memory 604 can include read only memory and random access memory and provides instructions and data to the processor 601. A portion of the memory 604 can also include a non-volatile random access memory. For example, the memory 604 can also store information of the device type.

In a specific implementation, the processor 601, the input device 602, and the output device 603 described in the embodiments of the present disclosure may implement the implementation of the present disclosure.

In a specific implementation, the processor 601, the input device 602, and the output device 603 in this embodiment may perform the first embodiment and the implementation manner described in the second embodiment of the service request method provided by this embodiment. The implementation manner of the terminal described in this embodiment may also be implemented, and details are not described herein again.

FIG. 4 is a flow chart of a servo motion control method according to an embodiment of present disclosure. In this embodiment, the method is a computer-implemented method executable for a processor, which may be implemented through a servo motion control apparatus as shown in FIG. 2 or a robot as shown in FIG. 3. The method may be applied to a servo (or a servo controller) of a robot. As shown in FIG. 4, a servo motion control method for realizing smooth motion of a servo of the robot from a motion starts to the motion ends based on a simple smooth trajectory equation is provided, and the method includes the following steps.

S101: obtaining position parameters of a plurality of control vertices of the servo in a constant speed motion, wherein the plurality of control vertices are selectively a starting point and an ending point of the servo in the constant speed motion or preset fixed points of the servo in the constant speed motion.

Figure 5:
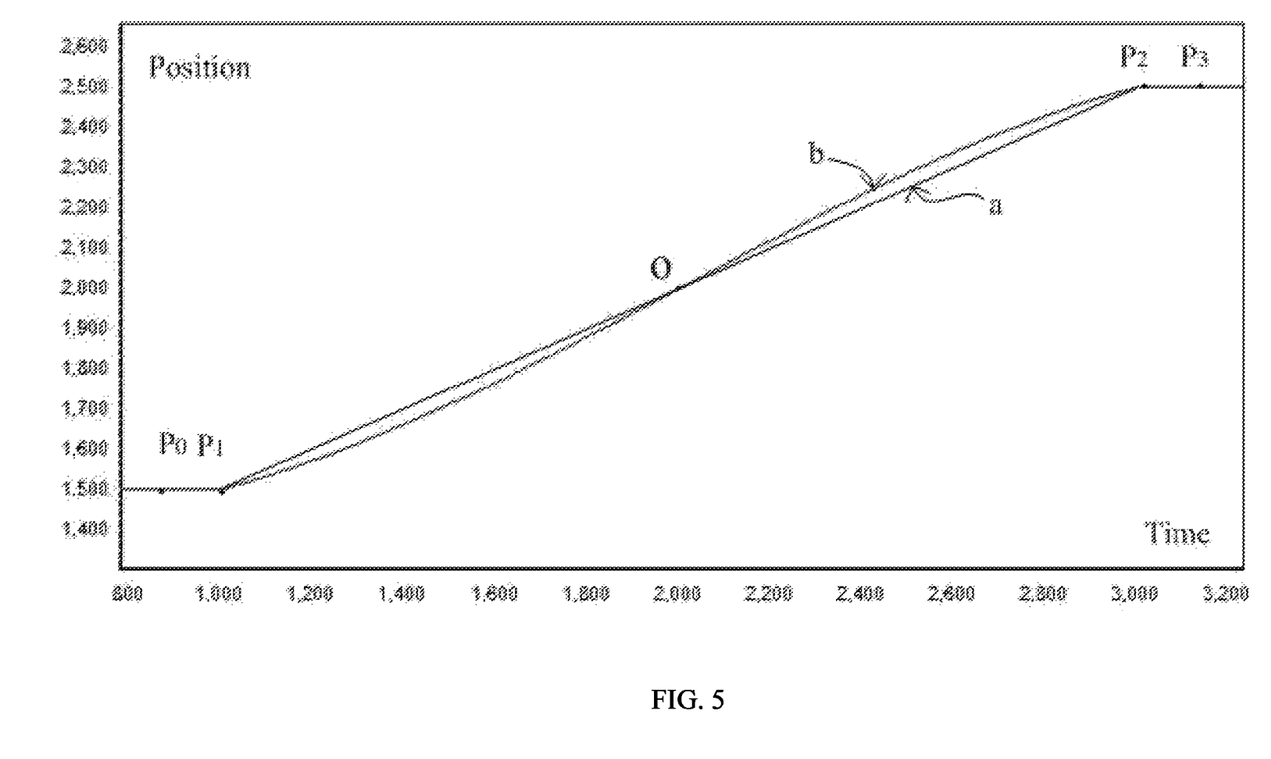
FIG. 5 is a schematic diagram of a motion curve of a servo according to the embodiment of FIG. 4.

FIG. 5 is a schematic diagram of a motion curve of a servo according to the embodiment of FIG. 4. As shown in FIG. 5, in this embodiment, referring to FIG. 5, the constant speed motion of the servo in FIG. 5 refers to the motion from point $P_1$ to point $P_2$, in which point A is the starting point while point B is the ending point. The preset fixed point in the constant speed motion refers to the point has to be passed through during the movement of the servo in accordance with the design of the robot, for example, point O (2000, 2000) in FIG. 5.

In which, the amount of the control vertices can be set as needed. For example, multiple stalling points such as $P_0$ and $P_1$ can be taken from a starting position; multiple ending points such as $P_3$ and $P_2$ can be taken from an ending position.

S102: creating a first smooth trajectory equation of the servo to move from the starting point to the ending point based on the position parameters of the plurality of control vertices.

In this embodiment, the first smooth trajectory equation is created based on a preset n-th powered Bezier curve and the position parameters of the plurality of control vertices.

In one embodiment, the amount of the control vertices is n+1, each of the control vertices is represented as $P_i$ (i=0, 1, ..., n). Before step S102, the method includes:

normalizing time parameters of the servo in the constant speed motion into an interval [0,1].

Correspondingly, the created first smooth trajectory equation is:

$$P(t) = \sum_{i=0}^{n} P_i B_{i,n}(t);$$

where $$B_{i,n}(t) = C_n^i (1-t)^{n-i} t^i, \quad C_n^d = \frac{n!}{i!(n-i)!},$$

0≤t≤1.

S103: controlling the servo to move based on the first smooth trajectory equation.

As shown in FIG. 5, in this embodiment, curve a is a motion curve of the servo in the constant speed motion, and the servo is controlled to move in accordance with curve b based on the first smooth trajectory equation when the servo is moved from the starting position (i.e., point $P_1$) to the ending position (i.e., point $P_2$).

It can be seen from the above-mentioned description that, by obtaining position parameters of a plurality of control vertices of a servo in a constant speed motion, where the plurality of control vertices are selectively a starting point and an ending point of the servo in the constant speed motion or preset fixed points of the servo in the constant speed motion; creating a first smooth trajectory equation of the servo to move from the starting point to the ending point based on the position parameters of the plurality of control vertices; and controlling the servo to move based on the first smooth trajectory equation, it is capable of realizing the smooth control of the motion of the servo from a starting position to an ending position, and avoiding the severe impacts during starting and stopping while the servo is in a constant high-speed motion, since the impacts will seriously affect the stability of the servo, which will cause a robot using the servo to move rigidly and even affect the steadiness of the robot. At the same time, the method is simple and suitable for the control of the servo of low-cost consumer or entertainment robots, which enhances the movement performance and user experience of the robot.

Referring to FIG. 5, in this embodiment, the amount of the control vertices is four. The control vertices includes a first control vertex $P_0$, a second control vertex $P_1$, a third control vertex $P_2$, and a fourth control vertex $P_3$.

The method may further include:
importing the first control vertex $P_0$, the second control vertex $P_1$, the third control vertex $P_2$, and the fourth control vertex $P_3$ into the first smooth trajectory equation to obtain a second smooth trajectory equation:

$$P(t)=(1-t)^3 p_0 + 3t(1-t)^2 P_1 + 3t^2 P_2 + t^3 P_3.$$

It can be seen from the above-mentioned description that, the smooth control of the servo can be realized through four control vertices, it has fewer parameters and low cost, and can be widely applied to the servo of consumer or entertainment robots, which is beneficial to the promotion of such robots.

Referring to FIG. 5, in this embodiment, the first control vertex $P_0$ is equal to the second control vertex $P_1$, and the third control vertex $P_2$ is equal to the fourth control vertex $P_3$.

The method further includes:
combining $P_0=P_1$, $P_2=P_3$, and the second smooth trajectory equation to obtain a third smooth trajectory equation:

$$P(t)=(1-t)^2(1+2t)P_1 + t^2(3-2t)P_2.$$

Specifically, the first control vertex $P_0$ and the second control vertex $P_1$ are the position parameters of the starting point, the third control vertex $P_2$ and the fourth control vertex $P_3$ are the position parameters of the ending point.

In other embodiments, the first control vertex, the second control vertex, the third control vertex, and the fourth control vertex may be preset fixed points in constant speed motion.

In another embodiment of the present disclosure, a non-transitory computer-readable storage medium is provided. The non-transitory computer-readable storage medium stores a computer program including program instructions. All or part of the processes in the method for implementing the above-mentioned embodiments of the present disclosure are implemented when the program instructions are executed by the processor, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The non-transitory computer-readable storage medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the non-transitory computer readable storage medium may be appropriately increased or decreased according to the requirements of legislation and patent practice in the jurisdiction. For example, in some jurisdictions, according to the legislation and patent practice, a non-transitory computer readable storage medium does not include electric carrier signals and telecommunication signals.

The computer-readable storage medium may be an internal storage unit of the robot of any of the above-mentioned embodiment, for example, a hard disk or a memory of the robot. The computer-readable storage medium may also be an external storage device of the robot, for example, a plug-in hard disk, a smart media card (SMC), a secure digital (SD) card, flash card, and the like, which is equipped on the robot. Furthermore, the computer-readable storage medium may further include both an internal storage unit and an external storage device, of the terminal device. The computer-readable storage medium is configured to store the computer program and other programs and data required by the terminal device. The computer-readable storage medium may also be used to temporarily store data that has been or will be output.

Those ordinary skilled in the art may clearly understand that, the exemplificative units and steps described in the embodiments disclosed herein may be implemented through electronic hardware, computer software, or a combination of the two. In order to clearly illustrate the interchangeability of hardware and software, the composition and steps of the examples have been generally described in terms of functions the above-mentioned description. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

Those skilled in the art may clearly understand that, for the convenience and simplicity of description, for the specific operation process of the above-mentioned terminal device and units reference may be made to the corresponding processes in the above-mentioned method embodiments, and are not described herein.

In the embodiments provided by the present disclosure, it should be understood that the disclosed terminal device and method may be implemented in other manners. For example, the above-mentioned apparatus embodiment is merely exemplary. For example, the division of units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, the functional units in each of the embodiments may be integrated in one processing unit, or each unit may exist alone physically, or two or more units may be integrated in one unit. The above-mentioned integrated unit may be implemented in the form of hardware or in the form of software functional unit.

The forgoing is only the specific embodiment of the present disclosure, while the scope of the present disclosure is not limited thereto. For those skilled in the art, various equivalent modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented motion control method for a servo of a robot, comprising executing on a processor steps of:
    obtaining position parameters of a plurality of control vertices of the servo in a constant speed motion, wherein the plurality of control vertices comprise a starting point and an ending point of the servo in the constant speed motion or preset fixed points of the servo in the constant speed motion;
    creating a first smooth trajectory equation of the servo to move from the starting point to the ending point based on the position parameters of the plurality of control vertices of the servo in the constant speed motion; and
    controlling the servo to move based on the first smooth trajectory equation.

2. The method of claim 1, wherein amount of the control vertices is n+1, each of the control vertices is represented as $P_i$ (i=0, 1, ..., n);
    wherein, before the step of creating the first smooth trajectory equation of the servo to move from the starting point to the ending point, the method further comprises:
    normalizing time parameters of the servo in the constant speed motion into an interval [0,1];
    wherein, the created first smooth trajectory equation is:

$$P(t) = \sum_{i=0}^{n} P_i B_{i,n}(t);$$

where, $$B_{i,n}(t) = C_n^i (1-t)^{n-i} t^i, \ C_n^d = \frac{n!}{i!(n-i)!},$$

$0 \leq t \leq 1$.

3. The method of claim 2, wherein the control vertices comprises a first control vertex $P_0$, a second control vertex $P_1$, a third control vertex $P_2$, and a fourth control vertex $P_3$;
    the method further comprises:
    importing the first control vertex $P_0$, the second control vertex $P_1$, the third control vertex $P_2$, and the fourth control vertex $P_3$ into the first smooth trajectory equation to obtain a second smooth trajectory equation:

$$P(t)=(1-t)^3 p_0 + 3t(1-t)^2 P_1 + 3t^2 P_2 + t^3 P_3.$$

4. The method of claim 3, wherein the first control vertex $P_0$ is equal to the second control vertex $P_1$, and the third control vertex $P_2$ is equal to the fourth control vertex $P_3$;
    the method further comprises:
    combining $P_0=P_1$, $P_2=P_3$, and the second smooth trajectory equation to obtain a third smooth trajectory equation:

$$P(t)=(1-t)^2(1+2t)P_1 + t^2(3-2t)P_2.$$

5. The method of claim 4, wherein the first control vertex $P_0$ and the second control vertex $P_1$ are position parameters of the starting point, the third control vertex $P_2$ and the fourth control vertex $P_3$ are position parameters of the ending point.

6. A motion control apparatus for a servo of a robot, comprising:
    a control vertex obtaining unit configured to obtain position parameters of a plurality of control vertices of the servo in a constant speed motion, wherein the plurality of control vertices comprise a starting point and an ending point of the servo in the constant speed motion or preset fixed points of the servo in the constant speed motion;
    a smooth trajectory equation creating unit configured to create a first smooth trajectory equation of the servo to move from the starting point to the ending point based on the position parameters of the plurality of control vertices of the servo in the constant speed motion; and a servo motion controlling unit configured to control the servo to move based on the first smooth trajectory equation.

7. The apparatus of claim 6, wherein amount of the control vertices is n+1, each of the control vertices is represented as $P_i$ (i=0, 1, ..., n);

the apparatus further comprises:

a data normalization unit configured to normalize time parameters of the servo in the constant speed motion into an interval [0,1];

the created first smooth trajectory equation is:

$$P(t) = \sum_{i=0}^{n} P_i B_{i,n}(t);$$

where, $$B_{i,n}(t) = C_n^i (1-t)^{n-i} t^i, \quad C_n^d = \frac{n!}{i!(n-i)!},$$

$0 \leq t \leq 1$.

8. The apparatus of claim 7, wherein the control vertices comprises a first control vertex $P_0$, a second control vertex $P_1$, a third control vertex $P_2$, and a fourth control vertex $P_3$;

the smooth trajectory equation creating unit is further configured to:

importing the first control vertex $P_0$, the second control vertex $P_1$, the third control vertex $P_2$ and the fourth control vertex $P_3$ into the first smooth trajectory equation to obtain a second smooth trajectory equation:

$P(t)=(1-t)^3 p_0 + 3t(1-t)^2 P_1 + 3t^2 P_2 + t^3 P_3$.

9. A robot, comprising:

a servo;

a memory;

a processor; and one or more non-transitory computer programs stored in the memory and executable on the processor, wherein the one or more non-transitory computer programs comprise:

instructions for obtaining position parameters of a plurality of control vertices of the servo in a constant speed motion, wherein the plurality of control vertices comprise a starting point and an ending point of the servo in the constant speed motion or preset fixed points of the servo in the constant speed motion;

instructions for creating a first smooth trajectory equation of the servo to move from the starting point to the ending point based on the position parameters of the plurality of control vertices of the servo in the constant speed motion; and instructions for controlling the servo to move based on the first smooth trajectory equation.

10. The robot of claim 9, wherein amount of the control vertices is n+1, each of the control vertices is represented as $P_i$ (i=0, 1, ..., n);

wherein, the one or more non-transitory computer programs further comprise:

instructions for normalizing time parameters of the servo in the constant speed motion into an interval [0,1];

wherein, the created first smooth trajectory equation is:

$$P(t) = \sum_{i=0}^{n} P_i B_{i,n}(t);$$

where, $$B_{i,n}(t) = C_n^i (1-t)^{n-i} t^i, \quad C_n^d = \frac{n!}{i!(n-i)!},$$

$0 \leq t \leq 1$.

11. The robot of claim 10, wherein the control vertices comprises a first control vertex $P_0$, a second control vertex $P_1$, a third control vertex $P_2$, and a fourth control vertex $P_3$;

the one or more non-transitory computer programs further comprise:

instructions for importing the first control vertex $P_0$, the second control vertex $P_1$, the third control vertex $P_2$, and the fourth control vertex $P_3$ into the first smooth trajectory equation to obtain a second smooth trajectory equation:

$P(t)=(1-t)^3 p_0 + 3t(1-t)^2 P_1 + 3t^2 P_2 + t^3 P_3$.

12. The robot of claim 11, wherein the first control vertex $P_0$ is equal to the second control vertex $P_1$, and the third control vertex $P_2$ is equal to the fourth control vertex $P_3$;

the one or more non-transitory computer programs further comprise:

instructions for combining $P_0=P_1$, $P_2=P_3$ and the second smooth trajectory equation to obtain a third smooth trajectory equation:

$P(t)=(1-t)^2(1+2t)P_1 + t^2(3-2t)P_2$.

13. The robot of claim 12, wherein the first control vertex $P_0$ and the second control vertex $P_1$ are position parameters of the starting point, the third control vertex $P_2$ and the fourth control vertex $P_3$ are position parameters of the ending point.

* * * * *